(12) United States Patent
Piestun et al.

(10) Patent No.: US 12,332,510 B2
(45) Date of Patent: Jun. 17, 2025

(54) WAVEFRONT SHAPING WITH A 1D SPATIAL LIGHT MODULATOR

(71) Applicant: The Regents of the University of Colorado, Denver, CO (US)

(72) Inventors: Rafael Piestun, Boulder, CO (US); Omer Tzang, Boulder, CO (US); Eyal Niv, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1141 days.

(21) Appl. No.: 17/271,135

(22) PCT Filed: Aug. 26, 2019

(86) PCT No.: PCT/US2019/048173
§ 371 (c)(1),
(2) Date: Feb. 24, 2021

(87) PCT Pub. No.: WO2020/041797
PCT Pub. Date: Feb. 27, 2020

(65) Prior Publication Data
US 2021/0255488 A1 Aug. 19, 2021

Related U.S. Application Data

(60) Provisional application No. 62/722,369, filed on Aug. 24, 2018.

(51) Int. Cl.
*G02B 27/48* (2006.01)
*G02F 1/01* (2006.01)

(52) U.S. Cl.
CPC ........... *G02F 1/0121* (2013.01); *G02B 27/48* (2013.01)

(58) Field of Classification Search
CPC .............................. G02F 1/0121; G02B 27/48
(Continued)

(56) References Cited

U.S. PATENT DOCUMENTS 8,243,355 B2 8/2012 Kroll et al.
2005/0147135 A1 7/2005 Kurtz et al.
(Continued)

FOREIGN PATENT DOCUMENTS

WO 2017/149064 A1 9/2017

OTHER PUBLICATIONS

Frostig, Hadas et al., "Focusing Light By Wavefront Shaping Through Disorder And Nonlinearity," Optica, vol. 4, No. 9, pp. 1073-1079, Sep. 2017.
(Continued)

*Primary Examiner* — Wyatt A Stoffa
*Assistant Examiner* — Mitchell T Oestreich

(57) ABSTRACT

Controlling the propagation and interaction of light in complex media has sparked major interest. Unfortunately, spatial light modulation devices suffer from limited speed precluding real-time applications (e.g., imaging in live tissue). To address this problem, various embodiments use a phase-control technique to characterize complex media based on use of fast 1D spatial modulators and 1D-to-2D transformation performed by the same medium being analyzed. Some embodiments use a micro-electro-mechanical grating light valve (GLV) with 1088 degrees of freedom modulated at 350 KHz, enabling unprecedented high-speed wavefront measurements. Some embodiments continuously measure the transmission matrix, calculate the optimal wavefront and project a focus through various dynamic scattering samples in real-time, (e.g., within 2.4 ms per cycle). As such, some embodiments improve, by more than an order of magnitude, prior wavefront shaping modulation speed and open new
(Continued)

opportunities for optical processing using 1D-to-2D transformations.

28 Claims, 17 Drawing Sheets

(58) Field of Classification Search
USPC .......................................................... 359/245
See application file for complete search history.

(56) References Cited

U.S. PATENT DOCUMENTS

2007/0070302 A1   3/2007  Govorkov et al.
2018/0107157 A1*  4/2018  Park ......................... G03H 1/02

OTHER PUBLICATIONS

International Application No. PCT/US2019/048173, International Search Report & Written Opinion, 11 pages, Dec. 19, 2019.

* cited by examiner

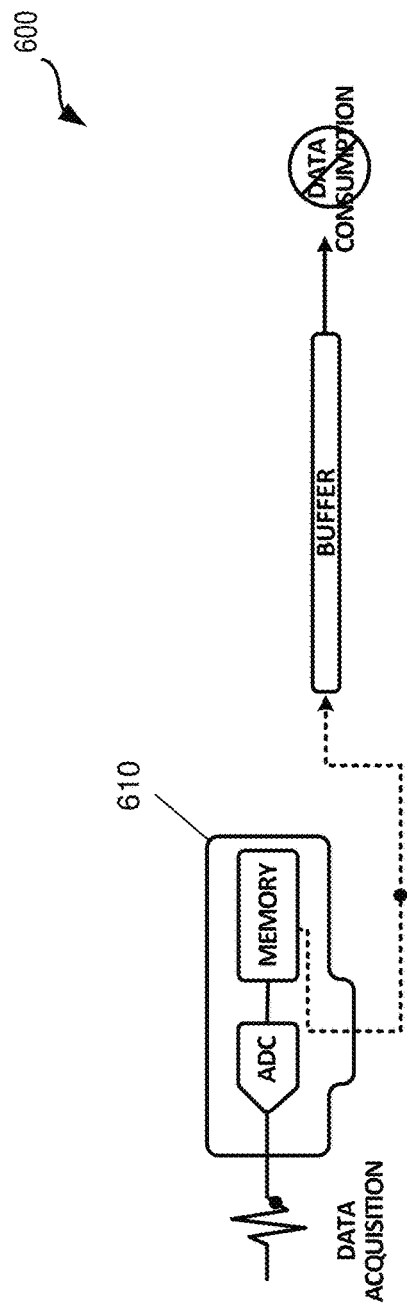
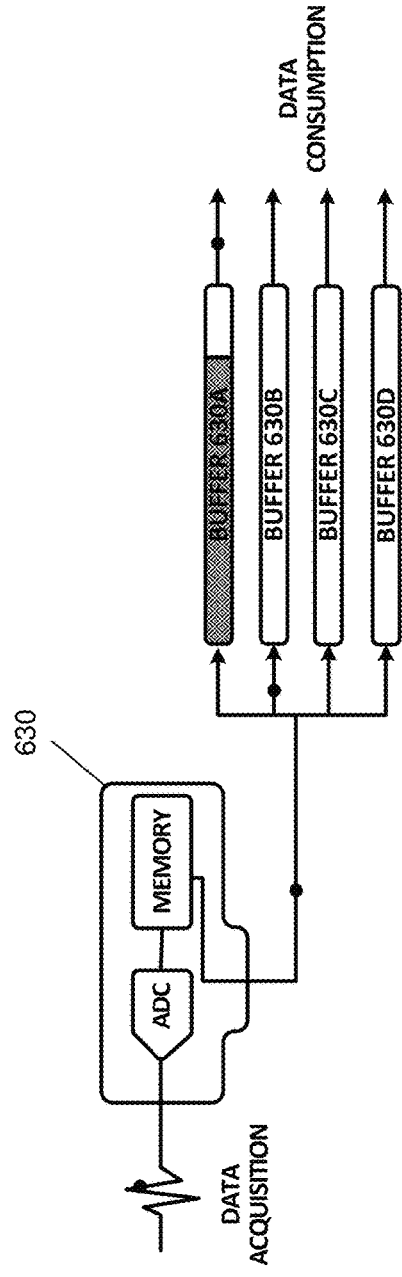
FIG. 6A
FIG. 6B

WAVEFRONT SHAPING WITH A 1D SPATIAL LIGHT MODULATOR

CROSS-REFERENCE TO RELATED APPLICATIONS

This application is a national stage of International Application No. PCT/US2019/048173 filed Aug. 26, 2019, which claims priority to U.S. Provisional Application Ser. No. 62/722,369 filed Aug. 24, 2018, both of which are incorporated herein by reference in their entireties for all purposes.

STATEMENT REGARDING FEDERALLY SPONSORED RESEARCH

This invention was made with government support under grant numbers 1548924 and 1611513 awarded by the National Science Foundation. The government has certain rights in the invention.

BACKGROUND

Recent developments in the field of wave-front shaping (WFS) have demonstrated control and optical focusing through complex media. Coherent light in such media generates randomly scattered light fields that are seen as random 3D interference patterns, known as speckles. Speckle fields can be manipulated by controlling the incident wave-front to generate enhanced intensity speckles at desired locations. Methods for focusing light through scattering media require an adaptive feedback process or phase conjugation to approximate the optical modes in the random media. Recent methods include wave-front optimization and direct inversion of the measured transmission matrix.

Changes over time in random scattering media lead to speckle field changes. The speckle decorrelation time is defined as the duration of the focus before the media changes enough to reduce the intensity of the focus by a given amount. Dynamic biological tissues are extremely challenging for wavefront-shaping focusing because blood flow reduces decorrelation times to the millisecond range. Typically, wavefront shaping is preformed using high resolution liquid crystal (LC) spatial light modulators (SLM) and deformable mirrors. LC-SLMs devices are characterized by refresh rates in the order of 2-100 ms. State of the art methodologies for faster wavefront optimization include micro-electro-mechanical system (MEMs) based mirror arrays, the use of binary deformable mirror devices (DMD) in phase modulation configuration, optical phase conjugation, and binary ferro-electric LC SLM. These recent methodologies improve the focusing speed over traditional SLM based techniques but use binary phase wavefront and consequently have lower enhancement potential. Moreover, phase conjugation focusing suffers from low SNR compared with feedback based WFS because it requires a light source inside or behind the scattering layer.

SUMMARY

Various embodiments of the present technology provide a high speed wavefront optimization for focusing through complex media using a fast 1D SLM with fast data acquisition and software adapted to the task. Some embodiments provide an order of magnitude improvement in measurement speed over the current fastest feedback wavefront determination method and four orders of magnitude improvement over LC-SLM methods. Real-time focusing through turbid materials during scan, focusing through dynamic scattering media, and controlling light at the output of multi-mode fibers (MMFs) of is available in some embodiments. The improved speed is a significant technological step forward and holds potential for wide-field, video rate focusing and imaging in dynamic scattering media as well as high-speed control in MMFs. The concept of 1D-2D scattering transformation provides insight into the speckle correlations and shape in WFS with dimensionality mismatch, while guiding the design and utilization of WFS systems.

Some embodiments include various s techniques for wavefront modulation. In some embodiments, a light can be illuminated on a one-dimensional spatial light modulator along a line or other illumination pattern. The one-dimensional spatial light modulator can project the light through or inside a complex medium. In accordance with various embodiments, the complex medium can be, but is not limited to an optical fiber, tissue, a biological sample, a photosensitive material, turbulent air, smog, or a turbid material. Then, a higher-dimensional field (e.g., speckle field, two-dimensional field, spatio-temporal field, light pulse, etc.) can be generated from the light transmitted through or inside the complex medium.

In some embodiments, measurements of at least one property of the light transmitted through or back-scattered from the medium can be captured. Based on the measurements of the at least one property of the light, the one-dimensional spatial light modulator can be instructed to change a state to modulate the light. In some embodiments, the modulated light can generate a wavefront that compensates some of the scattering or enhances energy delivery at a selected area or areas. In various embodiments, the modulated light can generate a wavefront that generates a light distribution or pattern at a selected area or areas on either side of the scattering medium. The wavefront can be optimized for focusing through, inside, or back from the complex (e.g., scattering) medium. The measurements can provide a transmission matrix of the medium or an optical phase to implement phase conjugation.

In some embodiments, a phase mask or amplitude mask can be adaptively changed in response to changes in the complex medium identified via the measurements. A one-dimensional optical field of the one-dimensional spatial light modulator can be transformed into a two-dimensional optical field by imaging each pixel or segment of a one-dimensional field vector onto a pixel or segment of a two-dimensional field matrix. The imaging can be controlled via a lens system array, a micro lens system array, a diffractive optical element, or computer generated hologram.

Some embodiments provide for a wavefront optimization system that includes a processing unit, a one-dimensional spatial light modulator, a light source, a scattering medium, and/or an imaging system. The processing unit can have one or more processors. The one-dimensional spatial light modulator can be communicably coupled to the processing unit. The processing unit can cause a phase or amplitude mask to be displayed on the one-dimensional spatial light modulator. The light source can be configured to generate a light that illuminates the one-dimensional spatial light modulator. The scattering medium can be illuminated with the wavefront produced by the one-dimensional spatial light modulator. The imaging system can be configured to measure at least one property of the light transmitted, backscattered, absorbed, or reflected from a scattering sample and communicate the at least one property to the processing unit.

In some embodiments, the processing unit can compute an updated phase or amplitude mask to generate a wavefront that compensates scattering or enhances energy delivery to a portion of the scattering sample. The one-dimensional spatial light modulator can include a memory in some embodiments on which a set of predefined phase and/or amplitude masks can be loaded before operation. In some embodiments, the one-dimensional spatial light modulator may also include a dynamic data transfer protocol to display calculated patterns on the one-dimensional spatial light modulator. Multiple lenses (e.g., cylindrical lenses, Powell lens, or other lenses) can be positioned between the light source and the one-dimensional spatial light modulator in various embodiments.

The wavefront optimization system may be part of an adaptive optics system that can be utilized for a microscope, an optical tweezer, a point spread function engineering, scanning imaging microscopy system, an energy delivery system, an optical communication link, or a telescope. In some embodiments, the wavefront optimization system can also include a random medium, diffractive optical element, computer generated hologram, hologram or grating array perform an optical transformation to rearrange one-dimensional degrees of freedom in a higher dimensional spatial configuration (e.g., 2D pixels, rings, arbitrary shapes, etc.).

Embodiments of the present invention also include computer-readable storage media containing sets of instructions to cause one or more processors to perform the methods, variations of the methods, and other operations described herein.

In some embodiments, a one-dimensional spatial light modulator can be illuminated along an illumination pattern. Measurements of at least one property of the illumination pattern transmitted through, reflected or backscattered from a medium can be captured. A one-dimensional optical field of the one-dimensional spatial light modulator can be transformed into a higher-dimensional optical field. Based on the higher-dimensional optical field, an optimal wavefront can be calculated that compensates for part of the scattering or enhances energy delivery at a selected area or areas. In some embodiments, transforming the one-dimensional optical field of the one-dimensional spatial light modulator into a two-dimensional field can include controlling a lens system array, controlling a micro lens system array, or generating a hologram. Based on the at least one property, the one-dimensional spatial light modulator can be instructed to apply a phase mask to the light and generate the optimal wavefront. The phase mask can be adaptively changed in response to changes in the measurements of the at least one property of the light. The measurement can provide an optical phase to implement phase conjugation.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIGS. 2A-2I illustrate speckle fields for different scatterer widths upon line illumination in accordance with some embodiments of the present technology.

FIGS. 6A and 6B illustrate a comparison of digital data acquisition and consumption schemes that may be used in accordance with various embodiments of the present technology.

Figure 1:
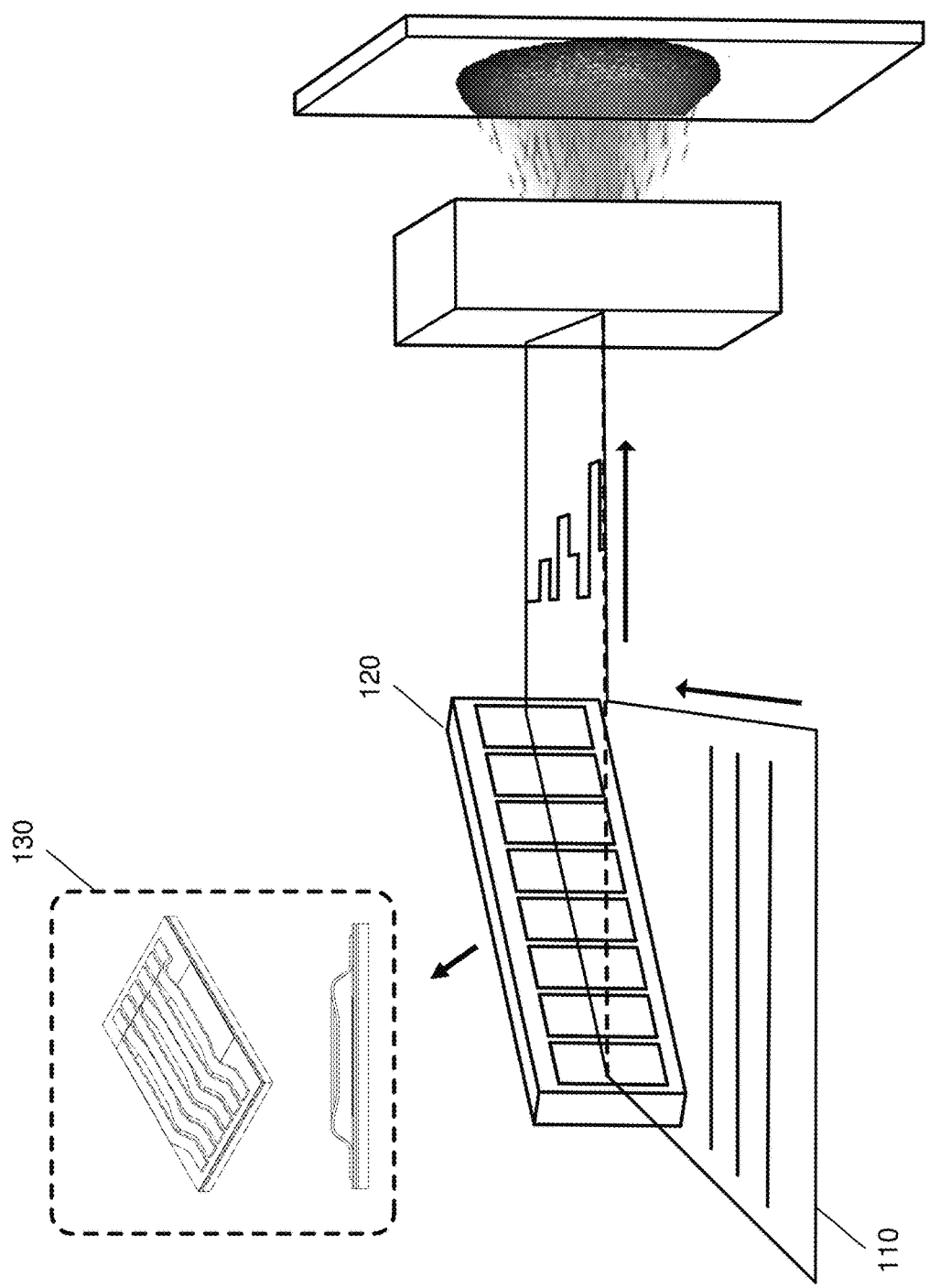
FIG. 1 illustrates the principle of 1D to 2D transformation for wavefront shaping with a 1D SLM in accordance with one or more embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology use fast one-dimensional (1D) spatial light modulators (SLMs) for two-dimensional (2D) wavefront-shaping (WFS) taking advantage of the scattering medium to perform the 1D-2D transformation. In effect, a highly medium randomizes the degrees of freedom, by spreading individual 1D pixels or modes into uncorrelated 2D speckle fields, and hence provides a means to transform a 1D optical signal into a 2D field.

Controlling the propagation and interaction of light in complex media has sparked major interest in the last few years. Unfortunately, spatial light modulation devices suffer from limited speed that precludes real-time applications such as imaging in live tissue. To address this critical problem, various embodiments use a phase-control technique to characterize complex media based on the use of fast 1D spatial modulators and a 1D-to-2D transformation performed by the same medium being analyzed. Some embodiments use a micro-electro-mechanical grating light valve (GLV) with 1088 degrees of freedom modulated at 350 KHz, enabling unprecedented high-speed wavefront measurements. Some embodiments continuously measure the transmission matrix, calculate the optimal wavefront and project a focus through various dynamic scattering samples in real-time, all within 2.4 ms per cycle. As such, some embodiments improve, by more than an order of magnitude, prior wavefront shaping modulation speed and open new opportunities for optical processing using 1D-to-2D transformations. For example, some embodiments provide a method for high-speed wavefront optimization. In accordance with some embodiments, a one-dimensional spatial light modulator can be illuminated along a line or other illumination pattern. The one-dimensional spatial light modulator can project the illumination through or inside a medium to generate two-dimensional speckle fields. A measurement of at least one property of the light transmitted through the medium can be captured. Based on the measurement of the at least one property of the light, the one-dimensional spatial light modulator can be instructed to apply a phase mask to the light and generate a wavefront that compensates scattering and enhances energy delivery at a selected area.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates a 1D to two-dimensional 2D transformation for wavefront shaping with a 1D SLM. As illustrated in FIG. 1, a collimated and coherent laser beam 110 illuminates the 1D SLM 120 along a line. For example, a 1D MEMS phase modulator operating at 350 KHz is depicted in the top left inset 130 of FIG. 1. Using a tailored hardware and software implementation various embodiments of the present technology can measure the transmission matrix of complex media and focus light though the complex media very quickly (e.g., within 2.4 ms). Some embodiments may operate continually in real time and allows, allowing examination of rapidly changing media.

Various embodiments of the present technology may utilize a grating light valve (GLV), that is a high-speed, 1D-SLM, to speed up feedback-based focusing through complex media. The GLV can be a MEMs device, composed of thousands of free-standing silicon-nitride ribbons on a silicon chip, segmented into 1088 pixels, each composed of 6 ribbons as depicted in 130. By electronically controlling the deflection of the ribbons, the GLV functions as a programmable 1D phase modulator. The GLV allows fast (<300 ns) switching time, and high repetition rate operation (350 KHz in our case) along with continuous phase modulation. These properties allow three to four orders of magnitude faster operation compared to LC-SLMs, and more than one order of magnitude faster operation compared to binary amplitude DMDs and other binary phase modulators. However, utilizing the GLV device for focusing in complex media requires tailored optical design as well as custom software-hardware implementation and signal processing.

1D-to-2D Transform Via Complex Media

The basis for the use of a 1D phase modulator to enable 2D control of light propagating through complex media is now discussed. In accordance with various embodiments, the scattering medium can perform a 1D-to-2D optical transformation by randomly distributing each 1D illuminating-mode into a 2D speckle field. Hence, assuming the speckle modes are fully developed, in the sense that the fields are random and uncorrelated in phase and amplitude, a 1D SLM provides the same 2D degrees of freedom as a 2D SLM with the same number of pixels. Mathematically, upon propagation through a thick random scatterer, the 1D and 2D wavefront modulators are essentially equivalent (as discussed in further detail below). Notwithstanding, the physical effect of a relatively thin (or relatively weak) scatterer can be analyzed when the illumination shape is non-symmetric. For example, a 1D modulated light-line in various embodiments.

To model the far-field speckle shape generated by a scatterer of variable thickness with modulated light-line illumination, the scattering medium can be represented with a transmission matrix (TM) correlation formulation expanded to vectorized 2D fields (rather than 1-D). The presence of speckle correlations, or Memory effect, manifests as a diffused elongated pattern at the near-field output of the scatterer and an elongated speckle grain in the orthogonal direction in the far-field. As the memory effect decreases, with a thicker scatterer, the speckle field becomes isotropic. A similar effect and behavior would be observed with a weak scatterer of given thickness as the scattering mean free path decreases.

The TM model (discussed below) used in some embodiments, takes into account random scattering as a complex normalized Gaussian random TM between the 2D input and output fields, T2D. The memory effect is modeled by multiplying T2D by a bound diagonal matrix, C2D, that establishes different degrees of the memory effect (see discussion below). The width of the Gaussian filter used to generate C2D, $\sigma$, is proportional to the degree of memory effect and in turn, the scatterer thickness.

Figure 2A:
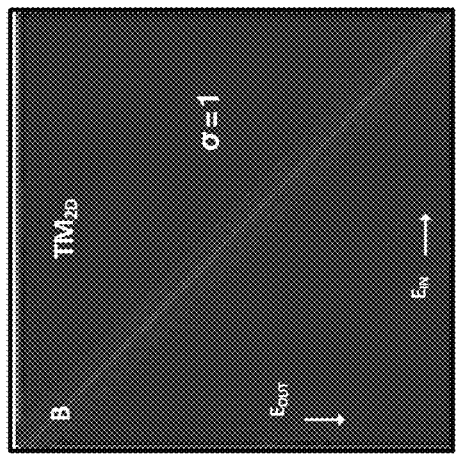
Figure 2B:
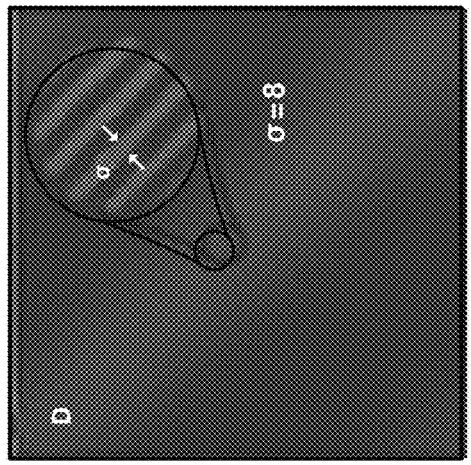
Figure 2C:
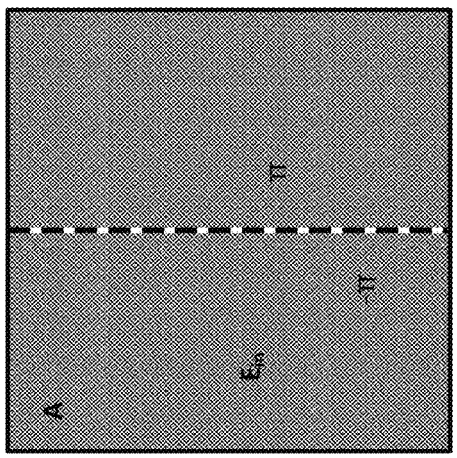
Figure 2D:
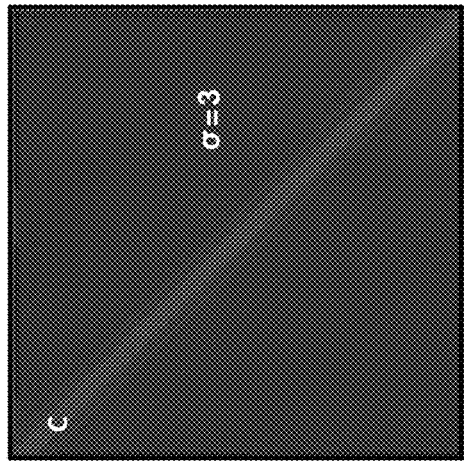

FIGS. 2A-2I illustrate speckle fields for different scatterer widths upon line illumination. In FIG. 2A, the line illumination input field is shown. A line of alternating phases ($\pi$, $-\pi$) is depicted with constant amplitude. A 1D Hadamard phase pattern as the input field, shown in FIG. 2A, generates three distinctively different output fields FIGS. 2F-2H. FIGS. 2B-2D illustrate a 2D transmission matrix corresponding to increasingly thick scatterer showing a bound diagonal structure for $\sigma=1,3,8$, respectively. Note that the off-diagonal width increases with increasing σ. The speckles in this far-field observation plane appear elongated and become more isotropic as the scatterer width is increased.

Figure 2F:
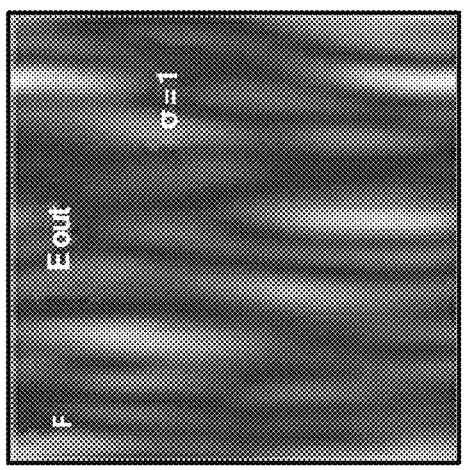
Figure 2H:
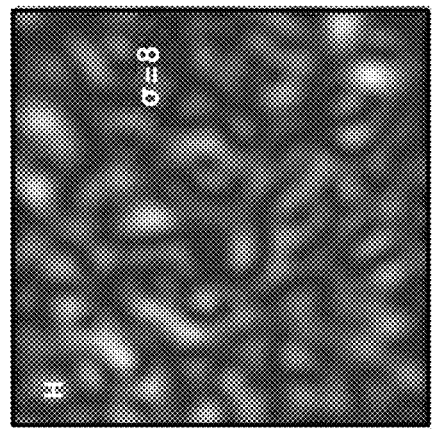
Figure 2E:
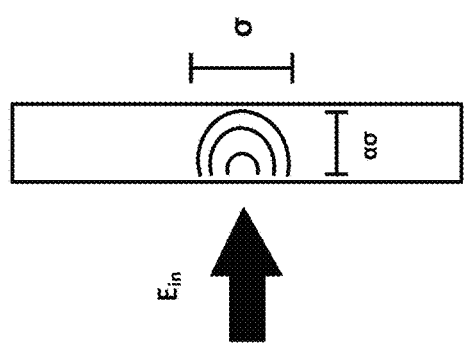
Figure 2G:
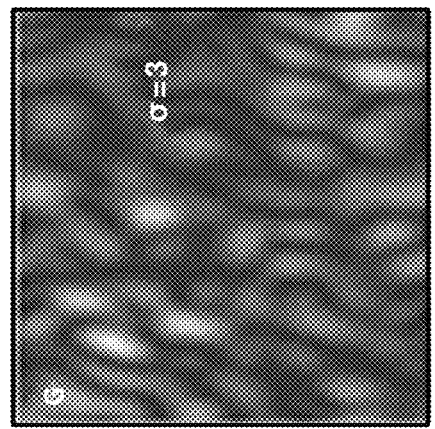
Figure 21:
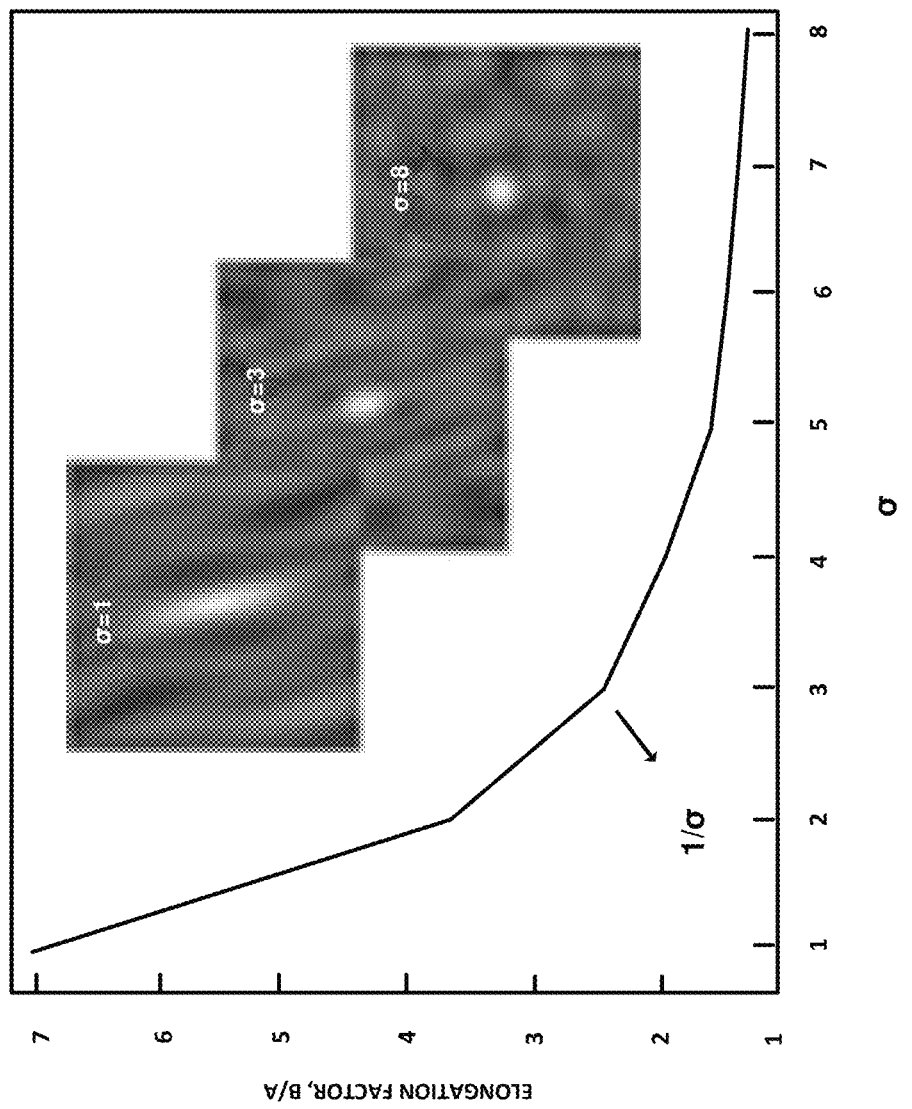

In FIG. 2E, a pencil beam illuminating a thin slab is shown causing a diffuse spot at the output surface, whose angular spread, σ is of the order of the slab thickness. This angular spread along the orientation of the line illumination causes an elongation factor of 1/σ in the far field speckle in the orthogonal direction. In FIGS. 2F-2H, the calculated Fourier transform of the output field for the TM shown in FIGS. 2B-2D, respectively.

FIG. 2l is a plot of the speckle elongation as a function of the scattering properties of the sample. At each point of the plot, the speckle elongation generated by a line illumination is calculated, as a function of σ, the width of a 2D Gaussian pupil function, that is convolved with a random simulated TM. This Gaussian pupil corresponds to the scattering sample thickness and directly relates the Memory effect (angular correlations) to the far-field shape of the speckles, as detailed below. The "elongation factor" (ratio of major and minor axes) of the output field autocorrelation is plotted, averaged over 100 random realizations. The insets of FIG. 2I show characteristic shapes of speckle autocorrelation with different σ.

To quantify the speckle grain elongation, the autocorrelation of the speckle images and their corresponding average speckle grain size can be calculated. The elongation factor can be defined as the ratio of the average grain's major and minor axes. FIG. 2I shows the elongation factor drops as 1/σ. This is in agreement with the expected elongation in the far-field for a corresponding angular spread of σ in the near field image. Therefore, with non-symmetric illumination of the scattering sample, the memory effect of the scatterer results in speckle elongation that varies according to the thickness or memory effect of the scattering medium.

Experimental Setup

Figure 3:
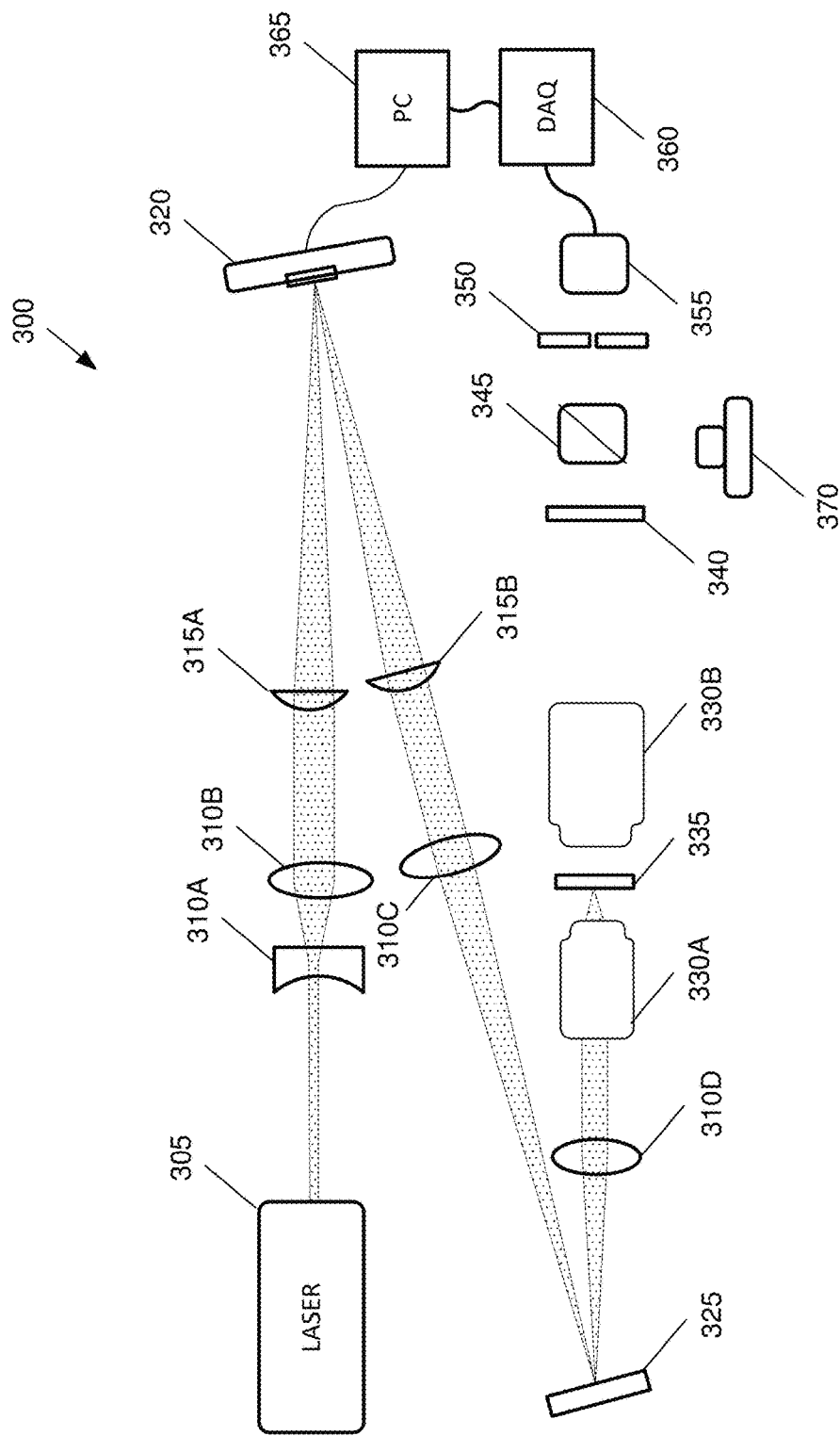
FIG. 3 illustrates the experimental setup that may be used in various embodiments of the present technology.

FIG. 3 illustrates and example of an experimental setup 300 that may be used in some embodiments of the present technology. In the embodiments illustrated in FIG. 3, the experimental setup 300 may include laser 305, lens (L) 310A-310D, cylindrical lenses (CL) 315A-315B, grating light valve (GLV) 320, mirror and spatial filter 325, objectives (Obj) 330A-330B, scattering media 335, polarizer (P) 340, beamsplitter (BS) 345, pinhole 350, avalanche photo-diode (APD) 355, data acquisition card (DAQ) 360, computer (PC) 365, and camera 370. As illustrated in FIG. 3, laser 305 illuminates GLV 320. In some embodiments, laser 305 may illuminate GLV 320 with a collimated 460 nm laser beam. For example, a 20 mW, 460 nm CW laser (e.g., New Focus, Vortex plus TLB 6800) can be used.

The expanded beam generates a line illumination on the GLV 320 (x-direction) after crossing a cylindrical lens 315A. As illustrated in FIG. 3, GLV 320 (e.g., F1088-P-HS) can be placed at a reflection angle of ~10 degrees. A collimating cylindrical lens and a 6× demagnifying 4f system image the GLV (expanded in the y-direction) on the back focal plane of a 10× objective. The scattering sample is located at the focal plane of the objective, thus being illuminated with the 1D Fourier transform of the GLV phase distribution. In accordance with various embodiments, lenses 310A-310D may have corresponding focal lengths of −50 mm, 300 mm, 300 mm and 50 mm. Cylindrical lenses 315A-315B may have focal lengths of 150 mm in some embodiments.

A 20× (NA=4) objective images a plane behind the scattering sample. The speckle field propagates onto pinhole 350 placed before APD 355. The back objective and the pinhole size are selected to match the pinhole to the scattered speckle size. The APD voltage can be digitized by a fast DAQ 360 (e.g., Alazartech, ATS9350), and sent to computer (or processing unit) 365 where it is used to calculate the wavefront (e.g., by a C++ program that controls all system computation and synchronization). A non-polarizing beam splitter 345 reflects 1% of the light on camera 370 (e.g., Point grey, Chameleon) to image the speckle field and focus spot.

For WFS focusing, the transmission matrix method can be used in some embodiments, because this method uses a set of predefined phase masks that can be loaded to the GLV memory before operation. Using a preloaded set of phase masks minimizes the data transfer time between the GLV and the computer, allowing the GLV to display all preloaded images at its maximum frame rate. One column of the transmission matrix can be characterized using three measurements per input mode and calculate one focus spot per cycle.

In some embodiments, a high-speed system can be enabled by the elimination of any computational or bandwidth bottlenecks in the feedback loop. As such, some embodiments use high-bandwidth data transfer hardware, a dual-port data acquisition scheme, and a multi-threaded C++ application to speed up the focusing process, as described in more detail below.

Figure 4C:
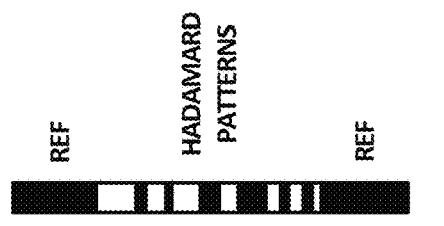
FIGS. 4A-4C illustrate high-speed WFS in accordance with some embodiments of the present technology.
Figure 4B:
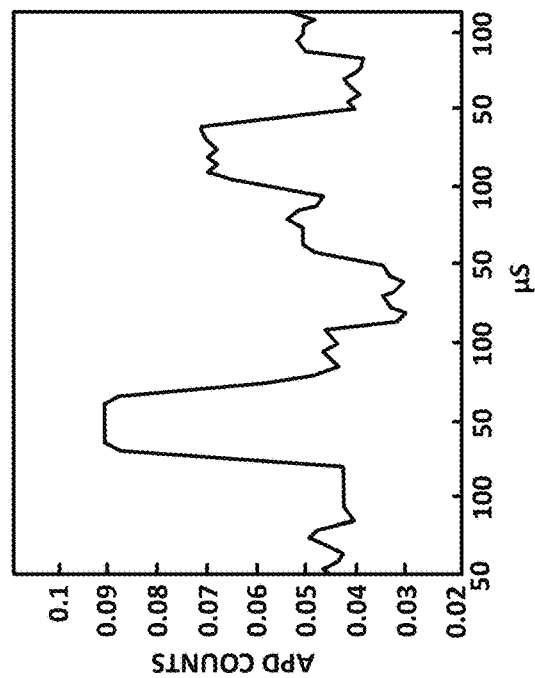
Figure 4A:
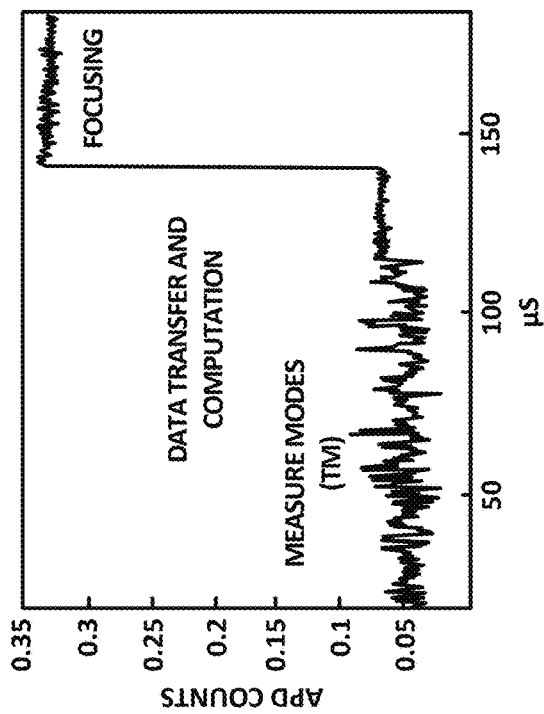

FIG. 4A shows the intensity of a feedback speckle during WFS including: several TM measurements, high-speed data transfer and computation, and displaying the calculated phase mask on the GLV for focusing. FIG. 4B shows the high-speed TM measurements. The preloaded N input modes, where N=256 or 512, are an orthogonal basis of phase patterns displayed on the center part of the GLV. Groups of GLV pixels can be dedicated for a modulated reference beam, displayed on both outer sides of the GLV, as shown in FIG. 4C. In the experiment, each mode interferes with three phase references (0, π/2, and π), displayed on the frame of the GLV and detected after propagation through the scattering medium by a fast detector. For precise phase measurements, the GLV's voltage to phase transformation can be calibrated. After measuring the complex field response for all the input modes, the phase conjugated field is calculated and displayed on the GLV for focusing, similarly to what is done for 2D SLMs.

Results

Using a ground glass diffuser (e.g., Thorlabs, DG05-1500) as the scattering medium, the GLV focusing system of some embodiments was tested. Each phase mask was displayed for ~2.8 μs on the GLV that operated at 350 KHz. Thus, for N=256, all 768 measurements for transmission matrix determination occurred in 2.15 ms. The APD signal is digitized and sent to the computer where the average intensity value for each measurement is used to calculate the transmission matrix of the system, and display the focusing phase, all within an additional 150 μs. Using the camera image, the enhancement can be calculated as the peak intensity to average background ratio.

Figure 5A:
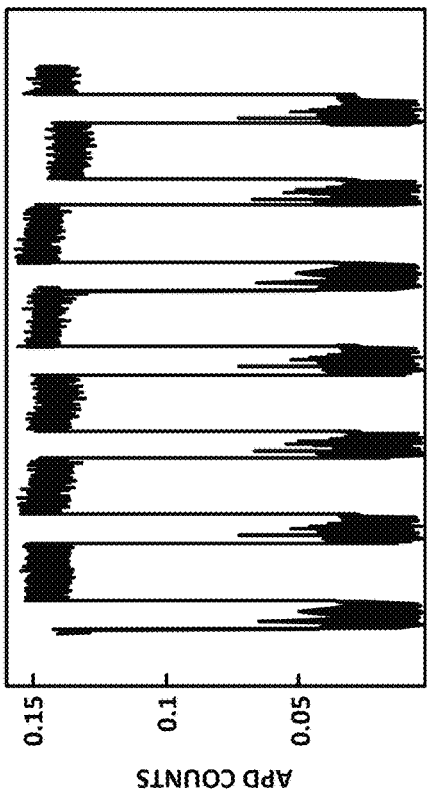
FIGS. 5A-5E illustrate enhancement of the focus spot versus time in accordance with some embodiments of the present technology.
Figure 5B:
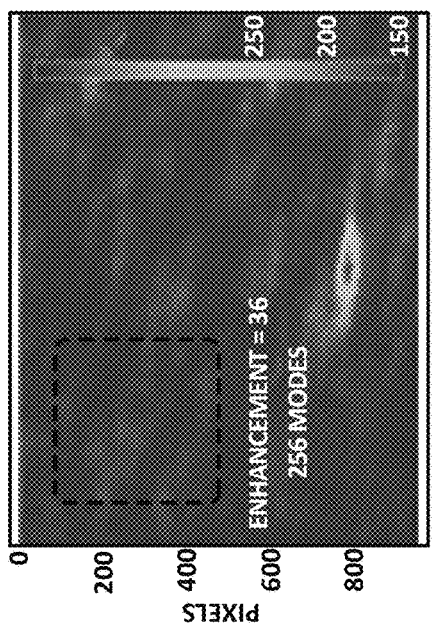
Figure 5C:
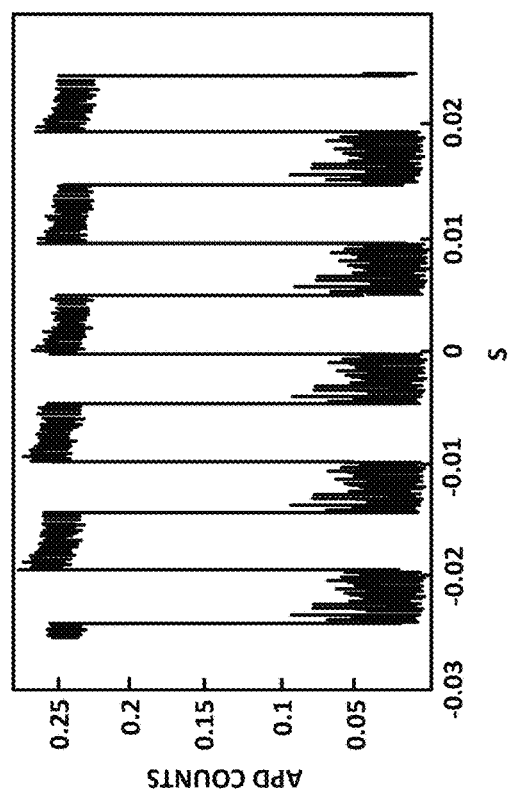
Figure 5D:
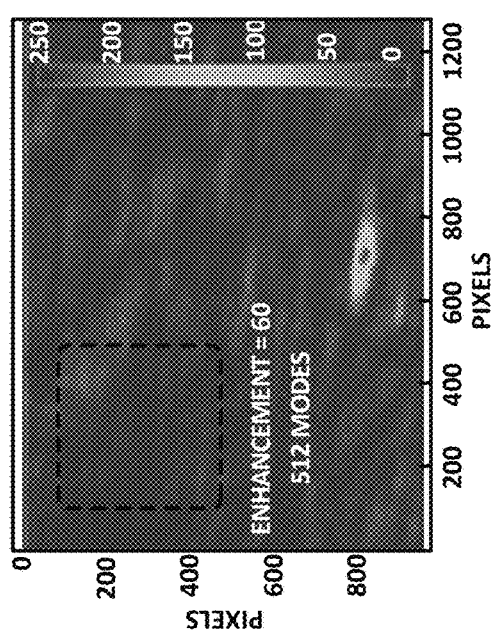

FIG. 5A illustrates the real-time focusing system using 256 modes. The focusing sequence takes 2.4 ms and the focus is kept for another 5 ms before the next measurement sequence. FIG. 5B shows an example of a focus spot with 256 modes, demonstrating enhancement of ×36 over the background level. The wave front was displayed continually and the reference beam blocked by displaying a high spatial frequency grating on the reference pixels and blocking its diffraction at the Fourier plane using a slit. FIGS. 5C-5D shows the results obtained with 512 modes and signal enhancement of ×60.

Various embodiments can continuously focus while the scatterer is shifting (e.g., laterally shifting). In some embodiments, the TM characterization of N=256 modes may take approximately 2.4 ms and the focus may be kept for 50 ms before the next TM measurement cycle begins. To test some embodiments of the system on controlled dynamic samples, scattering solutions were prepared with controlled viscosity and therefore varying speckle decorrelation times that mimic dynamic biological tissues. Some embodiments were also tested with various volume scattering samples including chicken breast, egg shell, and titanium-oxide nanoparticles, dried on a glass slide. All of these materials showed focusing enhancements in the same order as the glass diffuser.

In addition, some embodiments of the system were tested for focusing of coherent light at the output of an MMF, a similar scenario to the speckle focusing in random scattering media. In MMFs propagation of light is described by superpositions of propagating modes. Phase-velocity mode dispersion and random mode coupling arising from imperfections and bends contribute to creating complex 3D interference patterns observed as speckles at the fiber output. In the setup, the scattering medium was replaced with a 30 cm MMF, including input and output coupling optics. The algorithm and system used for the MMF optimization were similar. For optimal results, the coupling optics for imaging the GLV into the fiber can be adjusted with size-matched magnification that couple well all the GLV pixels.

Figure 5E:
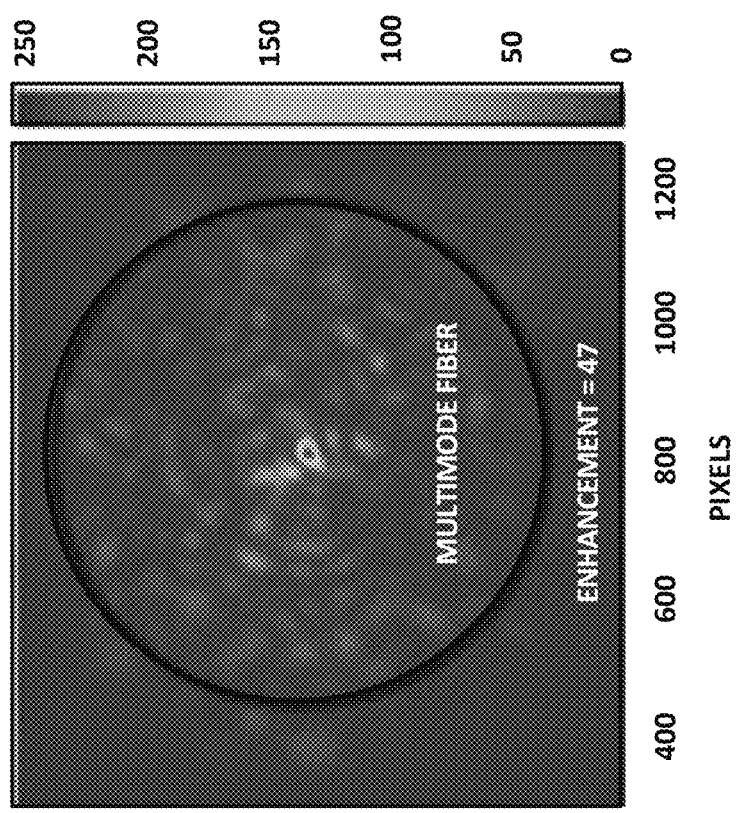

FIG. 5E shows a far field image of the fiber output during GLV optimization where a selected speckle is enhanced. In FIG. 5E, the focusing is at the output of a graded-index MMF with diameter of 50 μm, approximately 800 modes, and length of 30 cm. Far-field image of the fiber output are recoded after wavefront optimization using 256 modes, at full GLV speed. The enhancements are comparable to the case of scattering media. The black circle indicates the fiber core. The real time, high-speed control can maintain a focus at the output of a rapidly moving fiber (e.g., for in-vivo imaging, or for controlling nonlinearities in MMFs).

Discussion

The results from the tests of these embodiments show that proper system design enables the use of high-speed 1D SLMs for WFS. The notion of 1D-2D scattering transformation provides a framework for understanding and designing these WFS systems. Further system performance improvements are possible by taking into account the non-ideal characteristics of the GLV.

The intensity enhancement does not scale with N as predicted by theory in the ideal case and its values are lower than the enhancements obtained using a phase-only liquid crystal spatial light modulator and DMD. This is likely a result of unmodulated light, non-ideal operation of the GLV device, mechanical instability, and measurement noise. Additionally, the phase modulation range, determined by the GLV ribbon displacement, reached only $\sim 3/2\pi$ for our 460 nm laser and not full light cycle of $2\pi$, that matches 400 nm at reflection angle of 0 degrees. As a result, all phases between $3/2\pi$-$7/4\pi$ were set to $3/2\pi$ and all phases between $7/4\pi$-$2\pi$ were set to $2\pi$. This binary phase range reduced the accuracy of the calculated wavefront. With improved performance optimization, and shorter wavelength, various embodiments of the GLV are expected to reach ideal performance.

Each GLV pixel contains 6 ribbons that move up and down together. The spacing between ribbons creates reflections from the back surface that interfere coherently and generate an additional higher frequency grating. The efficiency of this residual diffraction grating changes with ribbons' displacement and reaches 5-10% of a GLV pixel grating diffraction. Consequently, observations indicate that increasing the ratio of signal pixels that are static in the experiment versus reference pixels that move up and down improves the focusing enhancement. For example, signal to reference pixel ratio of 70% and 95%, for the 256 and 512 modes, respectively, increased the overall SNR of mode interference, improved the accuracy of the measurement, and generated better enhancements. Either Hadamard or Fourier basis sets were used, with both showing similar performance.

The illumination optics in the tested setup included two cylindrical lenses that may cause astigmatism if their orientation is even slightly mismatched and may contribute to the speckle elongation in thin samples. Additionally, the inhomogeneous gaussian illumination of the 1D SLM using cylindrical lenses, even when the beam is expanded beyond the GLV, distribute varied intensity to pixels. When the TM mode are summed linearly in the focusing calculation, a phase error reduces the enhancement. This error could be improved by flat illumination using a Powell lens or corrected computationally. The elongation of speckles could be eliminated even in very thin samples by using an additional diffuser, placed before the media.

Note that the speed for focusing in scattering media is limited not only by the speed of the modulator and calculations but also by photon budget and SNR. Various testing used a high transmission scattering layer and had sufficient, but not optimal, detector SNR for fast optimization of a single speckle. In other low SNR scenarios, such as weak fluorescence deep inside tissue, signal averaging could limit the overall speed.

Processing Pipeline for Feedback Based Computation with Maximal GLV Bandwidth

The transmission matrix focusing scheme as well as other adaptive focusing methods, such as genetic algorithms, is based on feedback. Depending on the algorithm, additional data processing and computations are required to prepare the focusing wavefront displayed on the SLM. Therefore, besides a high-speed SLM and a fast detector, the key for a high-speed approach is to eliminate any computational, bandwidth, or latency bottlenecks in the feedback loop.

While the GLV switches faster than any other available SLM, it is also a very good match for an adaptive, feedback based, application since its electronics were designed to sink data almost as fast as its switching capabilities. This is a critical requirement for eliminating the latency and bandwidth bottlenecks. The data transfer pipeline to the GLV, in conjunction with its high-speed board (e.g., T1088-HS) is sourced over a low latency, high bandwidth, USB3 interface without significantly slowing down the switching rate.

For high speed processing, the dual-port data acquisition scheme, available in our DAQ, can be used that allows parallelization of data acquisition, data consumption, and processing. The acquired data is captured to an on-board memory buffer, while older data is transferred to the PC simultaneously. Compared to a single port data transfer, shown in FIG. 6A, the asynchronous data processing scheme, shown in FIG. 6B, allows continuous real-time monitoring of the signals. Data acquisition and data consumption are mutually exclusive and can be simultaneous in various embodiments. The bounded areas 610 and 620 indicates a DAQ with Analog-to-Digital Converter (ADC) and on-board memory. Buffers 630A-630D indicate host memory shared between the DAQ and the user application.

A multi-threaded C++ application armed the digitizer to acquire a collection of samples at 500 MHz and transfer them directly to the computer memory using Direct Memory Access and without any other copy operations from the CPU. While the digitizer was collecting the next set of samples, the previous set can be processed, and the memory segment can be returned to the digitizer memory pool for re-use in the next iteration.

Software data processing included temporal averaging of the digital interference signal, phase calculation, and superposition of the adjusted input modes for generating a focusing vector. Because of the simultaneous nature of the application, the focusing vector was available almost as soon as the data acquisition was completed. The elapsed time from the projection of last input mode to the projection of the focusing vector on the GLV was on the order of 50 µs, as depicted in FIG. 4.

GLV and Test Board Modifications

Figure 7A:
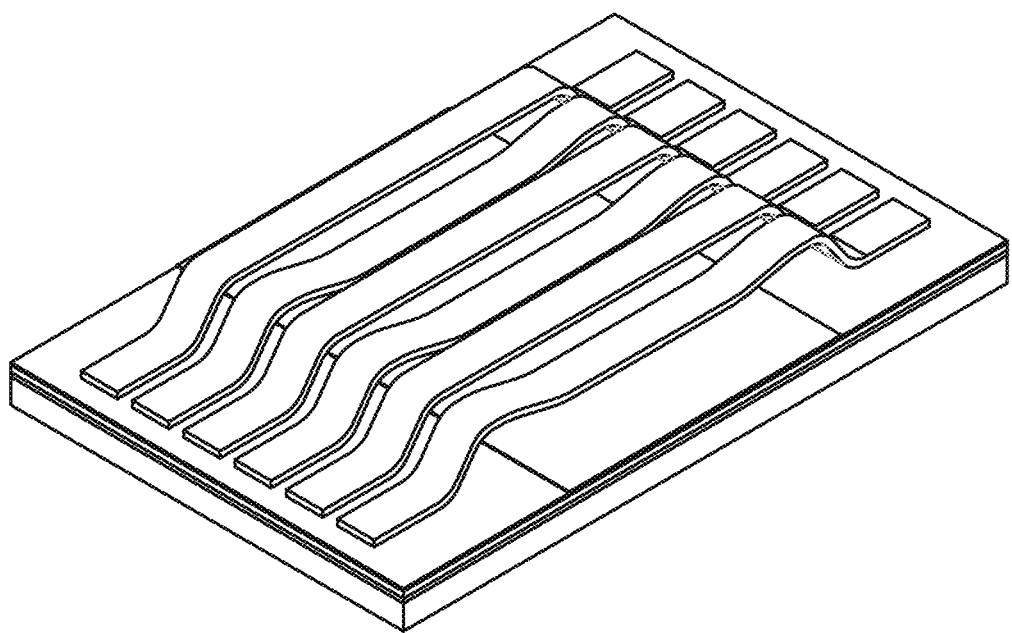
FIGS. 7A and 7B illustrate a GLV Standard Configuration as an Intensity Modulator.
Figure 7B:
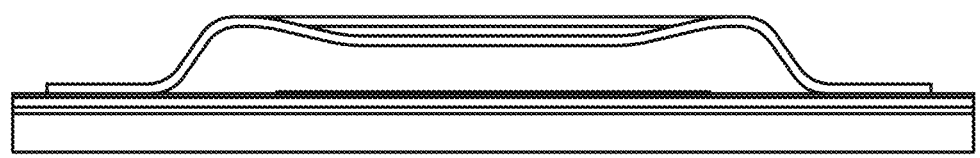

FIGS. 7A and 7B illustrate a perspective and side view of a GLV Standard Configuration as an Intensity Modulator that can be used in some embodiments. The GLV can be a high-speed linear spatial light modulator that is typically used for intensity modulation. Originally, the GLV was composed of 1088 pixels where each pixel comprises 3 active ribbons and 3 bias ribbons. A modification of the GLV (e.g., F1088-P from Silicon Light Machines) provides for phase modulation. The modification converts the bias ribbons into active ribbons so that each pixel comprises 6 active ribbons. The 1088 pixels of the GLV phase modulator implements a phase masks and allows for pure phase modulation in an optical system at an update rate of 350 KHz.

The Cosmo Test Board (e.g., T1088-HS) is part of the GLV evaluation kit and its function is to write pixel data (i.e. phase masks) to the GLV. Its primary components are an ARM micro-Controller, FPGA, pixel memory, a USB3 interface for inputting pixel data to the pixel memory and a custom high-speed interface to write the data to the GLV. A sequencer is implemented in the FPGA that writes the pixel data stored in pixel memory to the GLV. The standard configuration of the Cosmo requires that all pixel data is downloaded before starting the sequencer's write operation to the GLV.

Figure 8:
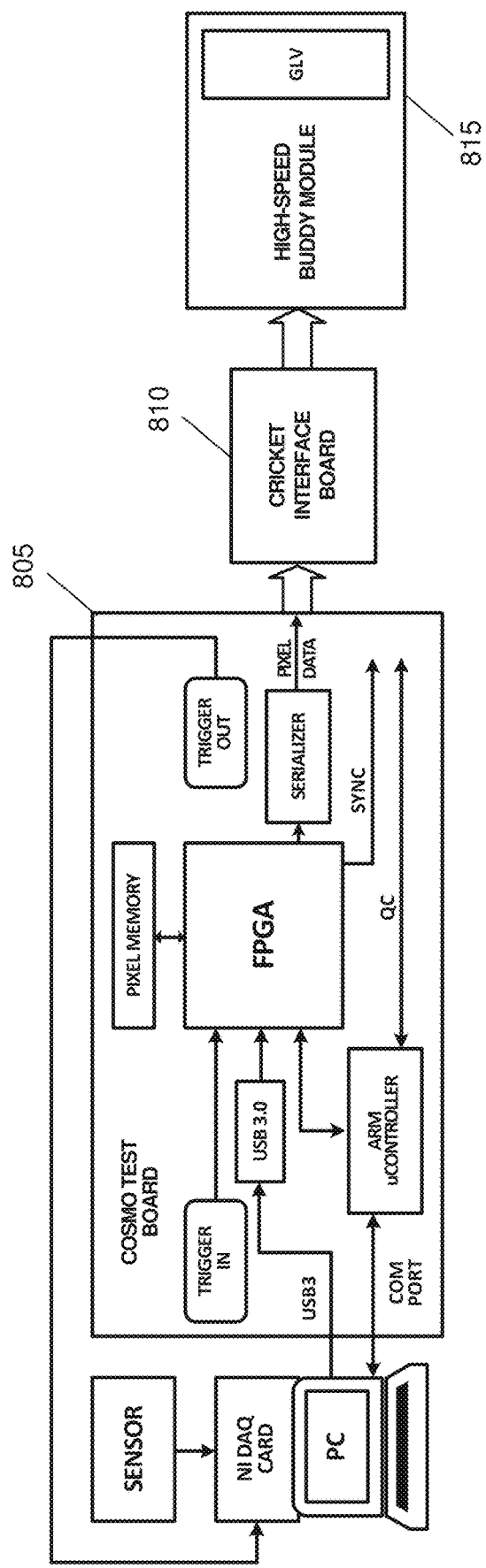
FIG. 8 illustrates a Cosmo Controller Board driving the Cricket Interface Board and GLV Module that may be used in some embodiments of the present technology.

FIG. 8 illustrates a Cosmo Controller Board 805 driving the Cricket Interface Board 810 and GLV Module 815. The Cosmo software and FPGA were modified for this application to allow the host computer to write a new line of pixel data via the USB interface into the pixel memory without stopping the sequencer. During system initialization, a group of fixed phase masks are downloaded to the Cosmo pixel memory. During operation, the system ran in cycles that consisted of the following steps: Cosmo sequencer writes the group of fixed phase masks to GLV, the DAQ acquires detector data, a new one-line phase vector is computed by the PC and sent to the Cosmo pixel memory via the USB3 interface and upon receiving the new phase vector then the Cosmo sequencer updates the GLV. The cycle time was greatly accelerated by customizing the Cosmo's firmware and FPGA.

Phase Calibration

Before each set of experiments, offline phase calibration can be performed that ensures accuracy in the phase measurements. This calibration step may be useful since the displacement of the MEMs ribbon with applied voltage is highly nonlinear and the phase modulation with ribbon displacement is wavelength dependent and also sensitive to slight changes of the GLV reflection angle and alignment. In the calibration, the GLV can display a series of phase gratings with increasing voltages and record the intensity of the zero-order diffraction for each of them. The recorded response to simulations can then be fitted. The GLV can be modeled as a square phase grating with period L. The amplitude transmittance of a square phase grating can be analytically described as:

$$t_A(x) = 1 - \left[(1 - e^{j\phi}) \times (\text{square wave})\right] = 1 - \left[(1 - e^{j\phi}) \times \sum_{n=-\infty}^{\infty} c_n e^{j\frac{2\pi nx}{L}}\right] \quad (1)$$

Now, taking the Fourier transform the transmission $$F\{t_A(x)\} = \delta(f_x) - (1 - e^{j\phi}) \sum_{n=-\infty}^{\infty} \frac{1}{2}\text{sinc}\left(\frac{n}{2}\right) F\{e^{j\frac{2\pi nx}{L}}\} = \quad (3)$$

$$\delta(f_x) - (1 - e^{j\phi}) \sum_{n=-\infty}^{\infty} \frac{1}{2}\text{sinc}\left(\frac{n}{2}\right) \delta\left(f_x - \frac{n}{L}\right)$$

Using the Fraunhofer approximation, the observed field can be found.

Where for the proof $c_n$ was defined such that it will look like a Fourier transform of a rect function:

$$c_n = \frac{1}{L}\int_{-\infty}^{\infty} \text{rect}\left(\frac{\xi}{L/2}\right) e^{-j\frac{2\pi n\xi}{L}} d\xi = \frac{1}{L} F\left\{\text{rect}\left(\frac{x}{\frac{L}{2}}\right)\right\}_{f_{X=n/L}} = \frac{1}{2}\text{sinc}\left(\frac{n}{2}\right) \quad (2)$$

In the measurement, a binary phase grating with alternating values of zero and the ramping GLV-voltage-bits was displayed on the GLV. The intensity of the zero order was measured, after a pinhold that blocked all other diffraction orders, using a photodiode. The dotted curve shows the grating simulation of the zero order, normalized, and symmetrically centered around the solid curve. For each phase value and corresponding normalized intensity in the blue curve, the lookup algorithm looks for the voltage values in the black curve that have matching or very close intensities.

The matching x axis values of the two curves map accurately phases to GLV voltages. This calibration lookup table, plotted in FIG. 9C, was implemented efficiently in software and to allow high speed operation. The bar plot of the look up table can map phase to GLV voltage bits. The phase values are multiplied by 100 for efficient software implementation. Note that the GLV's maximal modulation is ~3/2 π and beyond that, binary voltage values are assigned.

Speckle Shape with 1D Line Illumination

Figure 9A:
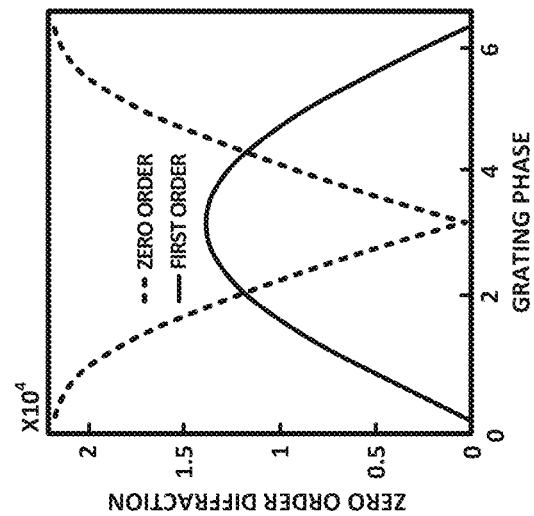
FIGS. 9A-9C illustrate a GLV Phase calibration according to one or more embodiments of the present technology.
Figure 9B:
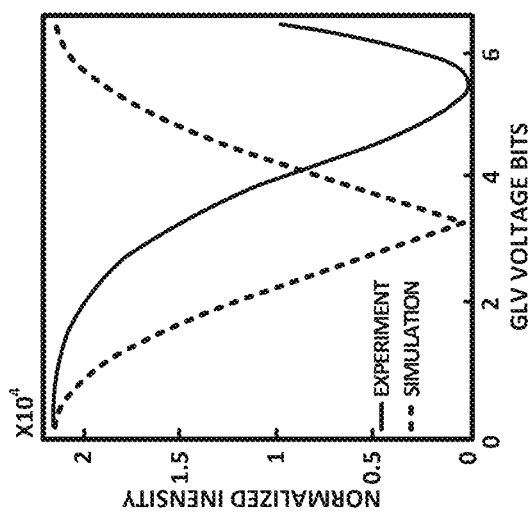
Figure 9C:
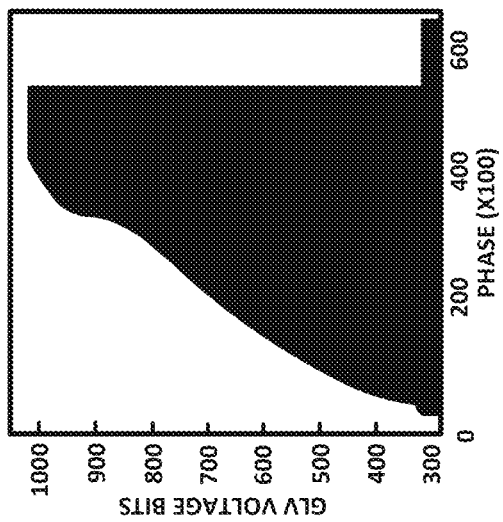

In the calibration, the Fourier transform of the grating in a spectral region of interest around the zero order was integrated numerically and the response for ramping phase gratings between 0-2π was, as shown for the 0th and 1st orders in FIG. 9A. Using the simulation and measurement curves, the voltage to phase transformation was calculated via tailored offline lookup algorithms that finds the GLV voltage that corresponds to a given phase value. In the lookup algorithm, for each 0-2π phase value, the simulated value (y axis in the red curve on FIG. 9A) was found to be a numerically very close value in the measured curve (y axis in the solid curve on FIG. 9B) was identified.

Figure 10A:
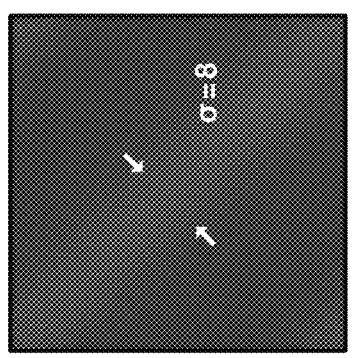
FIGS. 10A-10H illustrates modeling of speckles PSF with line illumination.
Figure 10B:
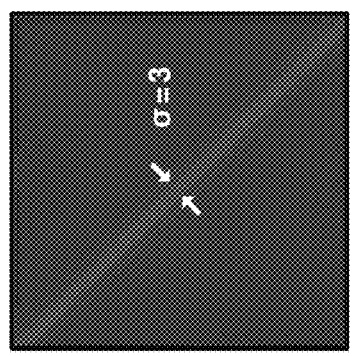
Figure 10C:
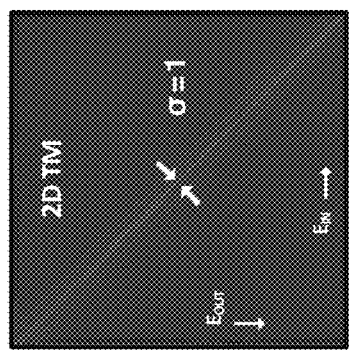
Figure 10D:
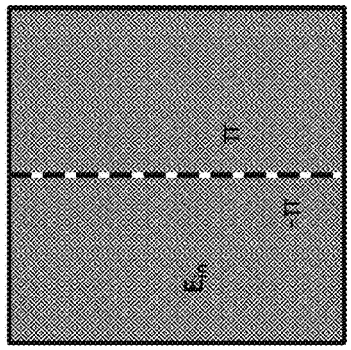
Figure 10E:
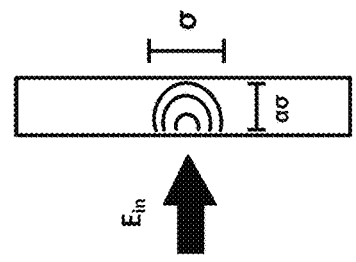
Figure 10F:
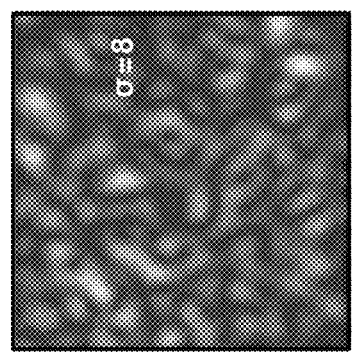
Figure 10G:
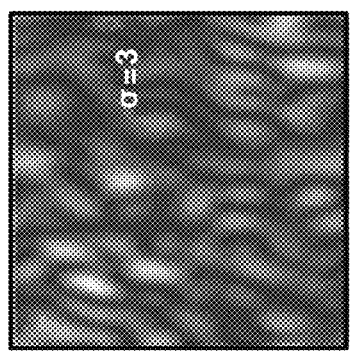
Figure 10H:
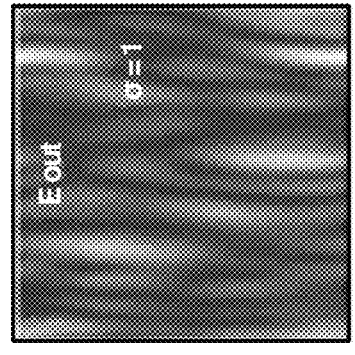

FIGS. 10A-10H illustrate modeling of speckles point spread function (PSF) with line illumination. In FIG. 10A, a line illumination input field is shown. A line of alternating phases (π, −π) is depicted with constant amplitude. In FIG. 10B, a pencil beam illuminating a thin slab will cause a diffuse spot at the output surface, whose angular spread, σ is of the order of the slab thickness. This angular spread along the orientation of the line illumination causes an elongation factor of 1/σ in the far field speckle in the orthogonal direction. In FIG. 10C, a 2D transmission matrix with nearly only diagonal elements, corresponding to a thin sample is shown. In FIG. 10D, the calculated Fourier transform of the output field is shown for the TM shown in FIG. 10C. In FIG. 10E-10G, a 2D transmission matrix with σ=3,8. In FIGS. 10F-10H, the output fields for the TMs shown in FIGS. 10E-10G are shown.

To simulate the far-field speckle shape generated by a scatterer illuminated with a 1D modulated light line, some embodiments generate a TM using a correlation formulation. The presence of speckle correlations, or Memory effect in thin scatterers can be shown to manifest as a diffused image of the line illumination at the output of the scatterer and an elongated speckle grain in the orthogonal direction in the far-field. As the memory effect decreases, with a thicker scatterer, the speckle field becomes isotropic.

The TM model takes into account random scattering, simulated by a complex normalized Gaussian random TM and the intrinsic memory effect for vectorized 2D fields instead of 1-D. This involves generating the random linear transformation matrix between the 2-D input and output fields, T2D, followed by convolution with a Gaussian filter to establish different degrees of the memory effect. The width of this Gaussian filter, σ, corresponds to the degree of memory effect and in turn, the scatterer thickness. The product of the random matrix and Gaussian filtered convolution matrix generates a narrow diagonal TM with varying degrees of correlation depending on the width σ. Three examples of such TMs with different σ values (in the order of the scatterer thickness) are depicted in FIG. 10B-10D.

Note that the off-diagonal widths increase with increasing σ. A 1-D Hadamard phase pattern as the input field, shown in FIG. 2A generates three distinctively different output fields, as shown in FIGS. 10F-10H. The speckles in this observation plane exhibit a tilt-shift memory effect and appear more or less elongated as a function of the scatterer width. Similar to our experiments, where speckles in the far-field were observed, FIGS. 10D-10H depict the Fourier transforms of the computed output fields. The speckles in this observation plane exhibit a tilt-shift memory effect and appear elongated.

To quantify the speckle grain elongation, we calculate the autocorrelation of the speckle images and find their corresponding average speckle grain size. The autocorrelation is thresholded, binarized, and the elongation factors, which we define as the ratio of the grain's major and minor axes, recorded. FIG. 2I shows the elongation factor drops as 1/σ. This is exactly the expected elongation in the far-field for a corresponding angular spread of σ in the near field image. Therefore, with non-symmetric illumination of the scattering sample, the memory effect of the scatterer results in speckle elongation that varies according to the thickness or tilt-shift memory effect of the scattering medium.

Theory of 1D-to-2D Transform Via Complex Media

The relation between the corresponding optical fields before and after a scattering media is represented by the transmission matrix, here in the general 2D case:

$$E_m^{out} = \sum_{n=1}^{N_{SLM}} t_{mn} E_n^{in}$$

The intensity field at the output, for any given spatial input, is defined as $$I_m^a = |E_{m'}^{out}|^2 = \left| E_{m'}^{ref} + \sum_{n=1}^{N} e^{i\alpha} t_{m'n} E_n^{in} \right|^2$$

Where $E_m^{out}$ is a 1D staked vector that correspond to a 2D output field. For a single focusing spot, the vector $E_m^{out}$ has 1 nonzero value.

$$E_{single\,spot}^{out} = \begin{bmatrix} 0 \\ 1 \\ 0 \\ 0 \\ \vdots \end{bmatrix}$$

If we neglect all other inputs for the purpose of single spot focusing, the input vector needs to multiply a transmission matrix that has one nonzero column:

$$t_{mn} = \begin{bmatrix} 0 & t_{1,2} & 0 & 0 \\ 0 & t_{2,2} & 0 & 0 & \cdots \\ 0 & t_{3,2} & 0 & 0 \\ & \vdots & & \end{bmatrix}$$

And the focusing operation to generate $E_{single\,spot}^{out}$ is:

$t_{mn} E_n^{in}$

Where $E_n^{in}$ is a 1D vector. It can be seen that even for 2D degrees of freedom, the transmission matrix operator is a 1D operator and hence, mathematically, the 1D and 2D degrees of freedom are identical.

Focusing Through Dynamic Samples

To test some embodiments of a system on controlled dynamic samples, scattering solutions were prepared composed of gelatin, water and Intralipid (20% solution). By varying the amount of gelatin, we controlled the viscosity and thus the dynamic scattering properties of our samples. The sample preparation involved heating the water to 40° C. and dissolving the gelatin and intralipid in it to form a uniform solution. The prepared samples were cooled down and mounted on a depression concave slide for a scattering experiment mimicking biological samples.

Figure 11:
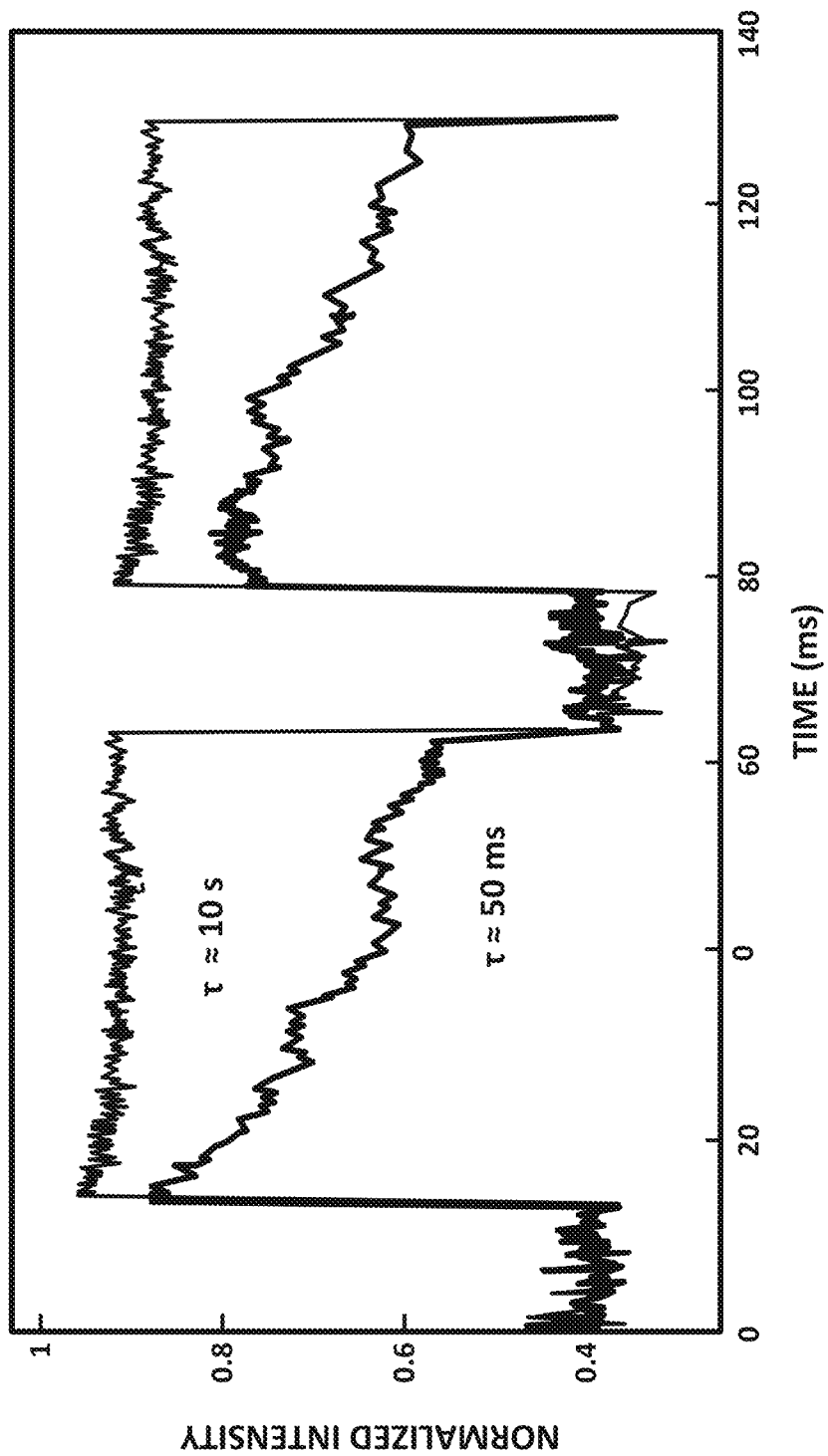
FIG. 11 is a plot illustrating focusing through dynamic scattering media.

FIG. 11 shows an example of focus optimization through samples with different speckle dynamics. The peak intensity during the focusing cycle (50 ms) stays constant for a static sample, while it decays in the case of the dynamic sample at a rate correlated to a speckle decorrelation time of τ=50 ms. The static sample was prepared with 2 teaspoons gelatin in 100 ml water and 12 ml lipid. The speckle decorrelation time is in the order of 10 seconds. The diluted solution was made with 40% water and speckle decorrelation times of 50 ms. The curves shown in FIG. 11 are the raw signal while the intense lines are their averages. We used 512 modes and GLV speed of 10 μs per mode.

1D to 2D Transformation

A 1D spatial light modulator (SLM) can be used as a 2D SLM in some embodiments. To illustrate the concept one exemplary implementation is described. The 2D equivalent device could then be used for a broad range of adaptive-optic applications including: adaptive microscopies, optical tweezers, point spread function engineering and scanning imaging microscopy.

Figure 12:
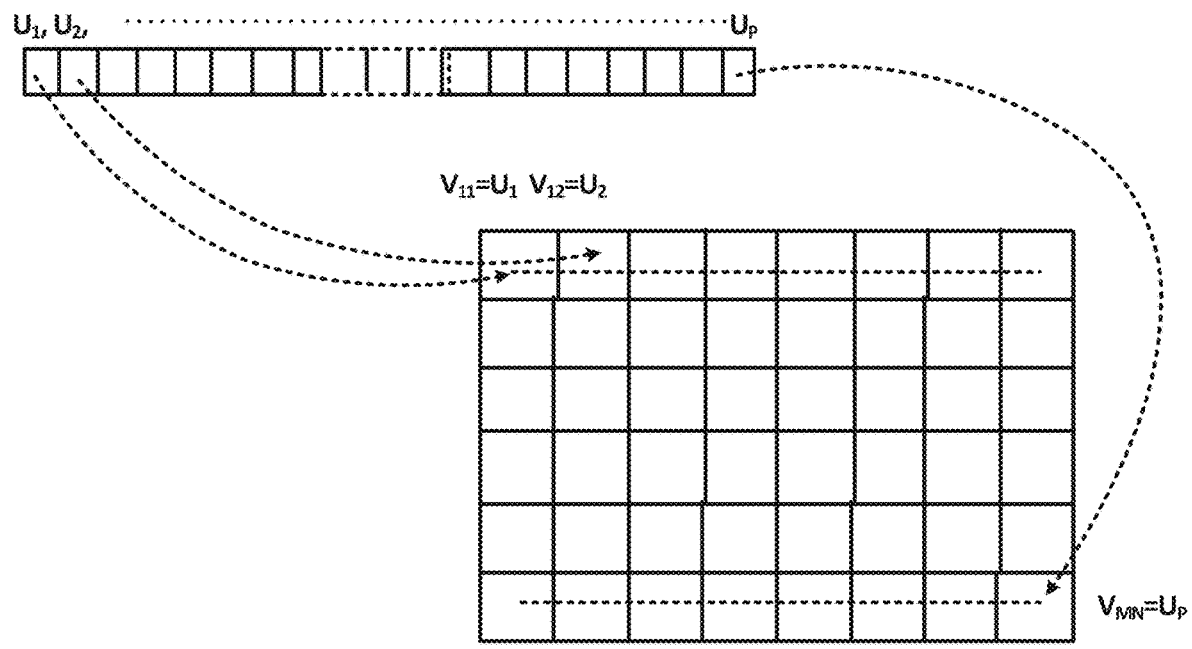
FIG. 12 illustrates each pixel of an essentially 1D field imaged onto a 2D matrix in a predefined sequence.

Approach 1: Transform the 1D optical field into a 2D optical field by imaging each pixel (or segment) of the 1D field vector onto a pixel (or segment) of a 2D field matrix. FIG. 12 shows schematically the concept. Each pixel of the 1D field is imaged onto a pixel of a 2D field, sequentially, or in any order possible. In FIG. 12, the 2D pixel v11 equals the 1D pixel u1, the v12 equals the u2, etc. This imaging could be achieved in a number of ways, for instance with (micro) lens system arrays or with holographic means.

Engineered 1D-to-2D holographic coordinate transforms could potentially be utilized for high-speed and efficient optical data processing using 1D modulators. In order to perform 2D WFS, a transformation hologram, placed on the optical path after the 1D modulator, would re-allocate 1D pixels into a 2D grid. The holograms or diffractive optical elements may be computer generated and fabricated on glasses or polymer. Here, the speed advantages of using a 1D arrangement of pixel is combined with a smart allocation of the pixels in engineered 2D space.

The hologram might be transmissive or reflective, fixed, or dynamic, optically recorded or computer generated, fabricated by lithography or implemented on a spatial light modulator. One means to redirect each pixel location is using gratings and lenses. Each small grating redirects the light in a different direction while the lenses image the specific pixel. A schematic implementation of this approach is depicted in FIG. 13.

Figure 13:
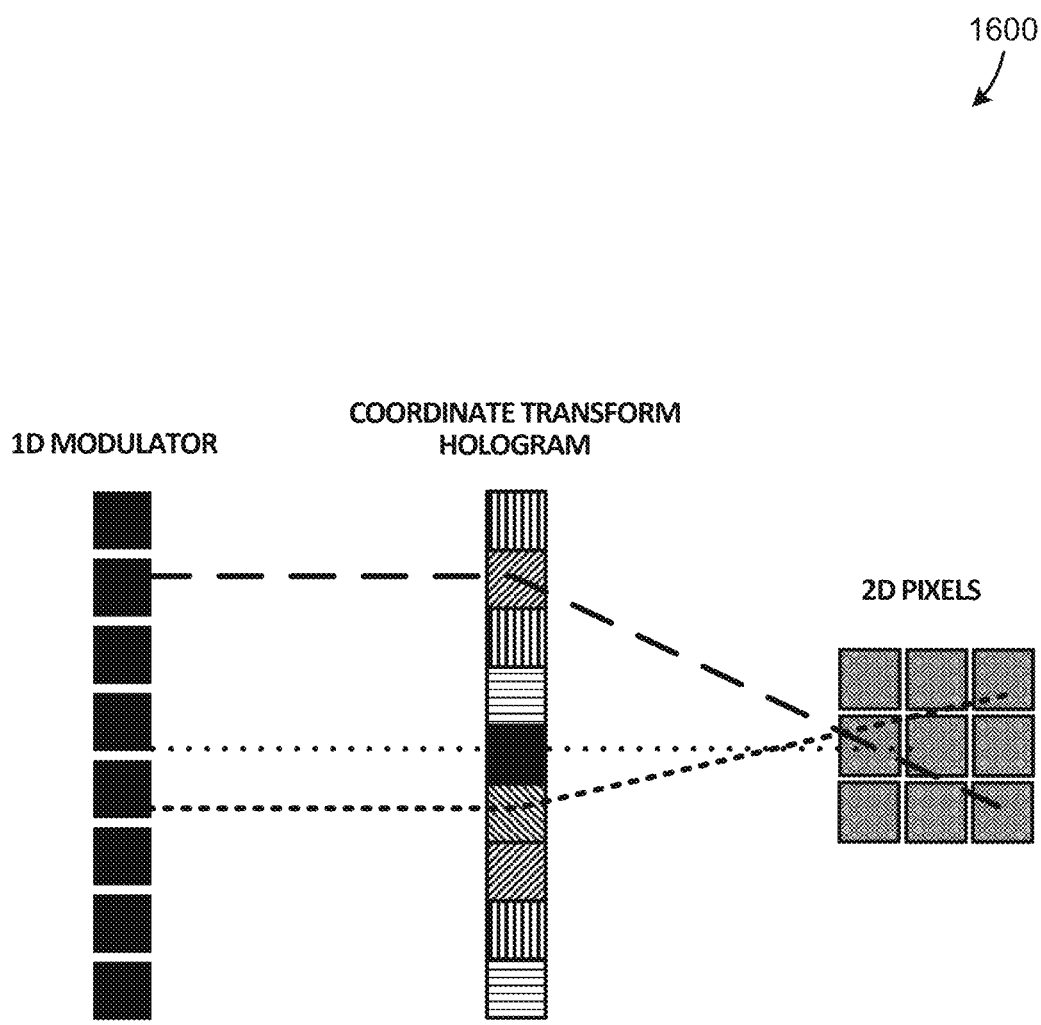
FIG. 13 illustrates the principle of holographic 1D-2D transformation.

FIG. 13 illustrate a principle of holographic 1D-2D transformation that may be used in various embodiments. Pixels of the 1D modulator are spatially allocated to form a 2D grid by a hologram, composed of engineered phase gratings.

Figure 14:
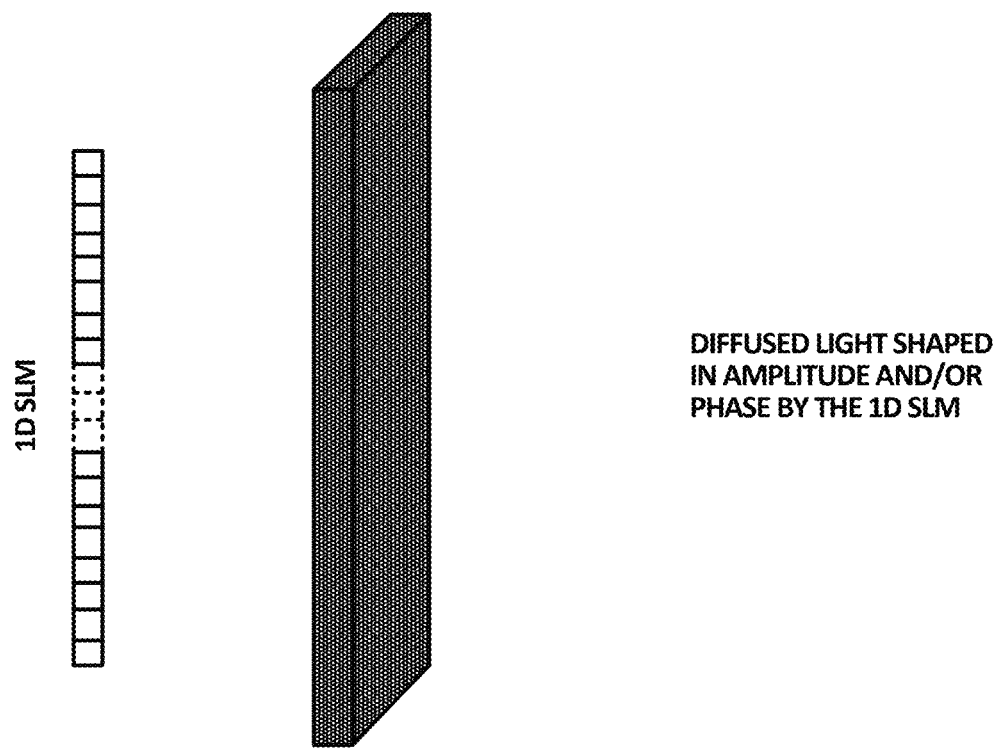
FIG. 14 illustrates 1D-2D transformation by an engineered diffuser.

Approach 2: The 1D field can be spread over a 2D field by means of a (engineered) diffuser. The 1D SLM can generate different tailored 2D field obtained by optimization or by direct calculation with knowledge of the diffuser transfer function (see FIG. 2 and FIG. 14). FIG. 14 illustrates a 1D-2D transformation by an engineered diffuser that may be used in various embodiments. The engineered diffuser is design to direct energy in a predetermined direction. The 1D SLM enables reshaping dynamically the energy distribution of this light in a controlled pattern.

CONCLUSION

Approach 2: The 1D field can be spread over a 2D field by means of a (engineered) diffuser. The 1D SLM can generate different tailored 2D fields obtained by optimization or by direct calculation with knowledge of the diffuser transfer function (see FIG. 2 and FIG. 14). FIG. 14 illustrates a 1D-2D transformation by an engineered diffuser that may be used in various embodiments. The engineered diffuser is designed to direct energy in a predetermined direction. The 1D SLM enables reshaping dynamically the energy distribution of this light in a controlled pattern.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method comprising:
   illuminating a light on a one-dimensional spatial light modulator along a line;
   projecting, from the one-dimensional spatial light modulator, the light through a medium; and
   generating a higher-dimensional field from the light transmitted through the medium.

2. The method of claim 1, wherein the higher-dimensional field is a speckle field.

3. The method of claim 1, wherein the higher-dimensional field is a two-dimensional field.

4. The method of claim 1, wherein the higher-dimensional field is a spatio-temporal field.

5. The method of claim 1, wherein the higher-dimensional field is a light pulse.

6. The method of claim 1, further comprising:
   capturing measurements of at least one property of the light transmitted through or back-scattered from the medium; and
   instructing, based on the measurements of the at least one property of the light, the one-dimensional spatial light modulator to change a state to modulate the light.

7. The method of claim 6, wherein the modulated light generates a wavefront that compensates some of the scattering or enhances energy delivery at a selected area or areas.

8. The method of claim 6, wherein the modulated light generates a wavefront that generates a light distribution or pattern at a selected area or areas on either side of the medium.

9. The method of claim 8, further comprising optimizing the wavefront for focusing through, inside, or back from the medium.

10. The method of claim 6, wherein the measurements provide a transmission matrix of the medium.

11. The method of claim 6, further comprising adaptively changing a phase or amplitude mask in response to changes in the medium identified via the measurements.

12. The method of claim 6, wherein the measurements provide an optical phase to implement phase conjugation.

13. The method of claim 1, further comprising transforming a one-dimensional optical field of the one-dimensional spatial light modulator into a two-dimensional optical field by imaging each pixel or segment of a one-dimensional field vector onto a pixel or segment of a two-dimensional field matrix.

14. The method of claim 13, wherein the imaging is controlled via a lens system array, a micro lens system array, a diffractive optical element, or a computer generated hologram.

15. The method of claim 1, wherein the medium is an optical fiber, tissue, a biological sample, a photosensitive material, turbulent air, smog, or a turbid material.

16. A method comprising:
   illuminating, with a light source, a one-dimensional spatial light modulator along an illumination pattern;
   capturing a measurement of at least one property of the illumination pattern transmitted through, reflected or backscattered from a medium;
   transforming a one-dimensional optical field of the one-dimensional spatial light modulator into a higher-dimensional optical field;
   calculating, based on the higher-dimensional optical field, an optimal wavefront that compensates for part of the scattering or enhances energy delivery at a selected area or areas; and
   instructing, based on the at least one property, the one-dimensional spatial light modulator to apply a phase mask to the light and generate the optimal wavefront.

17. The method of claim 16, wherein transforming the one-dimensional optical field of the one-dimensional spatial light modulator into a higher-dimensional optical field includes controlling a lens system array, controlling a micro lens system array, or generating a hologram.

18. The method of claim 16, further comprising adaptively changing the phase mask in response to changes in the measurement of the at least one property of the light.

19. The method of claim 16, further comprising implementing phase conjugation according to an optical phase provided by the measurement.

20. The method of claim 16, further comprising displaying calculated patterns on the one-dimensional spatial light modulator.

21. The method of claim 16, wherein the medium is an optical fiber, tissue, a biological sample, a photosensitive material, turbulent air, smog, or a turbid material.

22. The method of claim 16, wherein the higher-dimensional optical field is a speckle field.

23. The method of claim 16, wherein the higher-dimensional optical field is a two-dimensional field.

24. The method of claim 16, wherein higher-dimensional optical field is a spatio-temporal field.

25. The method of claim 16, wherein the higher-dimensional optical field is a light pulse.

26. The method of claim 16, wherein the transforming comprises imaging each pixel or segment of a one-dimensional field vector onto a pixel or segment of a two-dimensional field matrix.

27. The method of claim 26, further comprising controlling the imaging via a lens system array, a micro lens system array, a diffractive optical element, or a computer generated hologram.

28. The method of claim 16, further comprising performing an optical transformation to rearrange one-dimensional degrees of freedom in a higher dimensional spatial configuration.

* * * * *

UNITED STATES PATENT AND TRADEMARK OFFICE
CERTIFICATE OF CORRECTION

PATENT NO. : 12,332,510 B2  
APPLICATION NO. : 17/271135  
DATED : June 17, 2025  
INVENTOR(S) : Rafael Piestun et al.

Page 1 of 1

It is certified that error appears in the above-identified patent and that said Letters Patent is hereby corrected as shown below:

On the Title Page

Item (71), Applicant, after "The Regents of the University of Colorado," add --a body corporate,--

Signed and Sealed this  
Nineteenth Day of August, 2025

Coke Morgan Stewart  
*Acting Director of the United States Patent and Trademark Office*